Patented Dec. 10, 1935

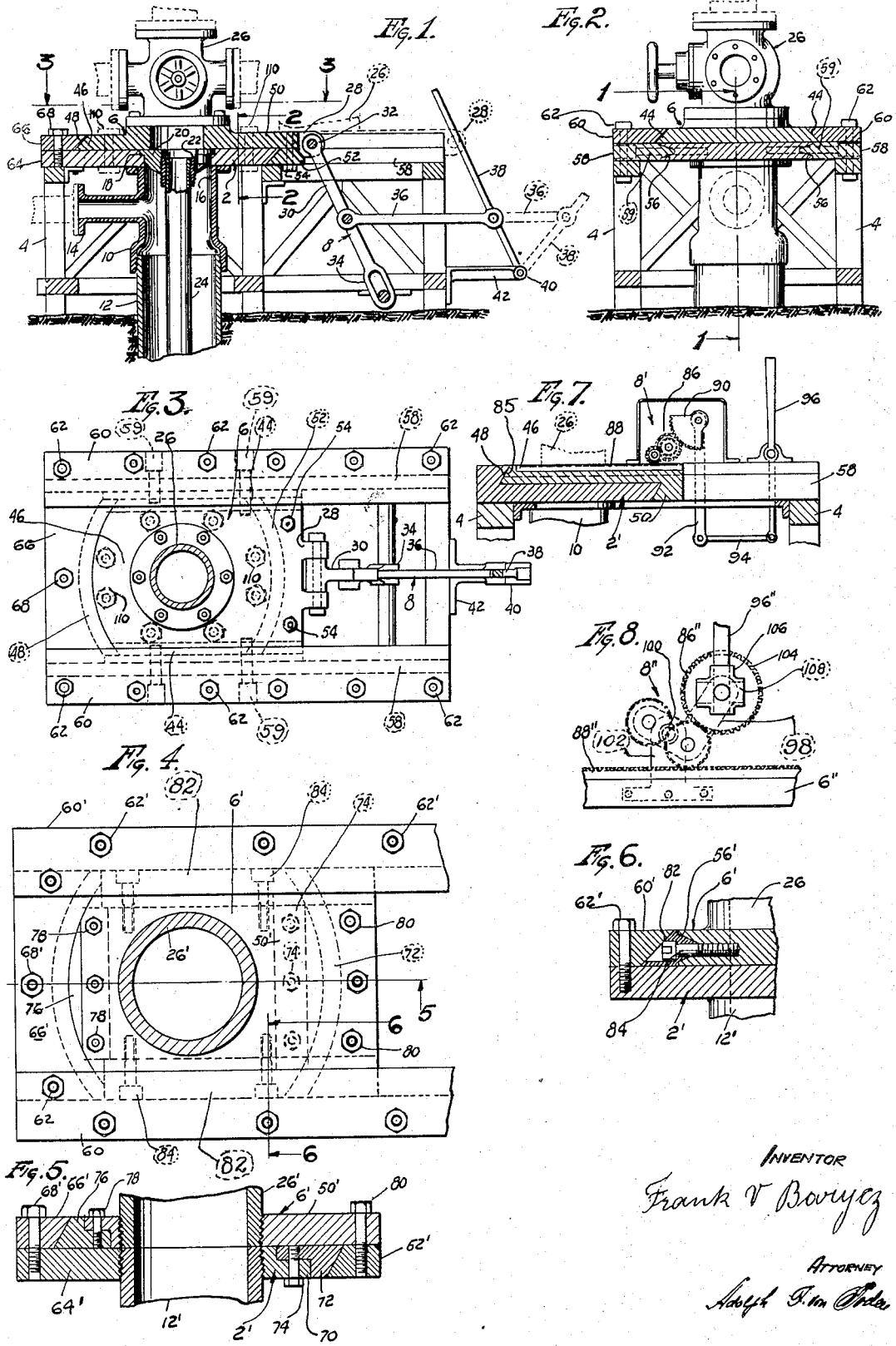

2,023,632

UNITED STATES PATENT OFFICE 2,023,632

VALVE FOR FLOWING WELLS

Frank V. Barycz, Los Angeles, Calif.

Application July 11, 1932, Serial No. 621,950

5 Claims. (Cl. 166—15)

My invention relates to valves for flowing wells, and more particularly to valves of such construction, whereby the fluids emanating from said wells, which are generally under pressure, may be quickly shut off and thus preventing fires or loss of fluid, as it may be in instances where the oil well is being brought in.

It, accordingly, is an object of my invention to provide said valve of such construction and having the locking means positioned thereon, in such a manner, so that, when the oil well is about to come in, the said valve may be easily and quickly closed over the well casing and thus allowing the workmen drilling said well, to connect to the said valve a controlling device, which is used for diverting the fluid from said well into the tanks.

A further object of my invention is to provide said valve with valve closing means, so that, said valve may be easily closed over the casing, irrespective of the fluid pressure which may be created within said well while it is coming in.

Another object of my invention is to provide said valve of such construction whereby it may be easily manufactured and assembled in the field by unskilled labor.

The further objects and advantages of my invention as will hereinafter more fully appear, I attain by the construction described in the specification and illustrated on the drawing, forming a part of my application.

Reference is had to the accompanying drawing, in which the similar reference characters denote the similar parts:

In the drawing:

Fig. 1 is a transverse cross-sectional view of my invention, showing the valve closed over the well casing, taken on the line 1—1, of the Fig. 2.

Fig. 2 is the cross-sectional view of my invention, taken on the line 2—2, of the Fig. 1.

Fig. 3 is the top view thereof, taken in the direction of the arrow 3, of the Fig. 1.

Fig. 4 is the enlarged top view, in modified form.

Fig. 5 is the cross-sectional view of my invention in modified form, taken on the line 5—5, of the Fig. 4.

Fig. 6 is the cross-sectional view thereof, taken on the line 6—6, of the Fig. 4.

Fig. 7 shows the automatic locking device for said valve.

Fig. 8 is the automatic locking device for said valve, shown in modified form.

Describing my invention more in detail, said invention comprises a base plate 2, mounted upon a frame structure 4, having the closing plate 6 slidably associated therewith, which is operated by mechanism 8, positioned as shown.

Said base plate 2, is connected to a casing extension 10, which is screwed to the well casing 12, and for the purpose of relieving the fluid pressures, I have provided said extension 10 with a by-pass outlet 14 which may be connected to the outlet pipe 15, (shown in dotted lines).

The base plate 2 has an opening 16, which is provided with a recess 18, adapted to receive a plug 20, having a nipple 22 screwed therein to receive the delivery pipe 24.

The closing plate 6 has a controlling valve 26 connected thereto, which is for the purpose of controlling and diverting the fluid emanating from said well, and, to control the position of said closing plate 6 over the base plate 2, by means of the said mechanism 8, I have provided said plate 6 with a yoke extension 28, having a lever 30 held in place by means of a pin 32, which extends to the conventional fulcrum 34 connected to the frame 4, and having the link rod 36 extended rearwardly to the operating handle 38, which is pivotally associated as at 40 with an extension bracket 42, as shown.

For the purpose of locking the closing plate 6 over the base plate 2, I have provided therefor the said plate 6 with tapered sides 44, the front section 46 having a semi-circular tapered section 48, and the rear section 50 is provided with a tapered lip plate 52, which is held in position by means of bolts 54, as shown.

The base plate 2, is provided with a semi-circular rear locking section 55 having side grooves 56, adapted to receive the side guiding bars 58, held therein by means of bolts 59, see Figs. 2 and 3, and which are mounted upon said structure 4 and upon which I have provided holding bars 60, bolted thereto by means of bolts 62, also, the front forward section 64 is provided with a tapered front locking plate 66 held in place by means of bolts 68, see Figs. 1 and 3.

In the Figs. 4 and 5, I have shown my invention in modified form wherein the casing 12' is screwed into the base plate 2', having the top of the forward section 64' equipped with a tapered locking plate 66' which is held in place by means of bolts 68', and, the rear section 70 is provided with a detachable tapered plate section 72, which is held in place by means of bolts 74; the closing plate 6' equipped with the controlling valve 26' is provided with a detachable tapered plate section 76, held in place by means of bolts 78, also, having the rear section 50' provided at its bottom with a tapered lip plate 52' which is held in place by means of bolts 80, thus causing said base plate 2' and the said closing plate 6' to be held and locked in place, as shown.

In the Fig. 6, I have shown the plate sliding arrangement, wherein the base plate 2' is equipped with the side guide 60', held thereon by means of bolt 62', and which is adapted to receive a detachable tapered section 82, held in place by means of bolts 84, within a groove 56' of the plate 6'.

In the Fig. 7, which is typical in general construction to Fig. 3, I have shown the operating mechanism 8', wherein the locking of the plate 6' over the base plate 2' is effected, by means of a train of gears 86 meshed with a rack 88, which is substantially connected with said plate 6'; the said gears 86 are operated by means of a segment 90, connected to a link 92 which is pivotally associated with a link rod 94 attached to a pivotally operating handle 96, so that, when the plate 6' is moved forward between the sides 44 into closing position, the tapered section 48 will engage the front section 46 by means of the tapered surface 85 and the rear section 50 will engage the rear locking section 55 by means of the tapered surface 87, as shown.

The Fig. 8 discloses the operating mechanism 8'', having a train of gears 86'' in mesh with the rack 88' which is connected to the closing plate 6''.

The said gears 86'' are mounted upon a gear plate 98, which is pivotally positioned as at 100, upon the bracket 102, having the driving gear 104 positioned as shown, and which is equipped with a hub 106, and having the openings 108 adapted to receive the operating handle 96''.

In operation, the plate 6 is held in place by means of the tapered sides 44 and when it is intended to close or cap the well casing, the said plate 6 is moved into place by means of the mechanism 8 and held therein by means of the circularly tapered section 48 and tapered lip plate 52, so that, if it is desirable to permanently lock in place the closing plate 6 and the base plate 2, I have provided for that purpose locking means in the form of bolts 110, as shown in Fig. 3, whereby, a positive control of the valve may be had at all times, so that the fluid flow from said well may be controlled.

While I have thus described my invention with great particularity, it will be noted that the same may be modified throughout a wide range. I, accordingly, do not propose to be limited to the exact details of construction shown and described, but reserve the rights in practice to make any other modifications and changes that may come within the scope of the appended claims.

I claim as my invention:

1. In the valves of the character described, comprising a base plate and a valve locking plate; said base plate having its front end provided with a locking section, tapering downwardly from its surface and angularly toward the rear of the said base plate, a pair of tapered side guiding plates connected at the top and the sides of the said base plate, having its tapered sides positioned in juxtaposition to each other and its surfaces disposed angularly in downward and outward direction from said base plate and a rear locking plate connected at the top and to the rear end of the said base plate, placed in adjacent position to the said guiding plates, having its angular surface disposed downwardly from the top and outwardly from the said base plate; said valve locking plate having its front and the side edges provided with tapered surfaces adapted to engage and interlock within the tapered rear locking plate and the said tapered side guiding plates, respectively, a tapered rear end locking section connected beneath the surface of the said valve locking plate, having its surface tapered forwardly toward the center of the said base plate and adapted to engage the said front end tapered section of the said base plate, so that the said valve locking plate, when in position upon said base plate, will be held and locked in place, substantially as described.

2. In the valves of the character described, adapted for controlling the flow of the fluid therethrough, comprising, a base plate and a valve locking plate disposed one over the other, said base plate having the front end provided with inwardly tapered surface edge, a pair of tapered guiding means connected at the top and the sides of said base plate and a tapered locking plate means connected at the rear end of the said base plate and adjacently positioned to the said tapered guiding means; said valve locking plate comprising, a pair of tapered sides adapted to engage the said guiding means, and a rear tapered end adapted to engage the said tapered locking plate of the said base plate, and locking means connected to the said valve locking plate engaging the said inwardly tapered surface at the front end of said base plate and means connected to the said valve locking plate and the said base plate to control their relative positions, causing the said valve locking plate to be held firmly in position and locked in place, while controlling the flow of the fluid through the said valve.

3. In the devices of the character described adapted to be used for controlling the flow of the fluid therethrough, comprising a base plate and a valve locking plate disposed one over the other, the combination of, a frame structure, said base plate positioned upon the said frame structure, having tapered guiding and locking means provided upon its sides, the rear and the front ends thereof, said valve locking plate slidably positioned upon said base plate having its sides, the front end and the rear end provided with tapered locking means engaging the said base plate, and valve controlling means connected to the said frame and the said valve locking plate adapted to control its position upon said base plate and thus controlling the flow of the said fluid therethrough.

4. In a valve of the character described, a pair of plates slidably positioned one over the other, comprising, a base plate means and the valve locking plate means, side guiding means positioned at the sides of the said base plate means and the said valve locking means, thus causing the said plates to be held in engaged position, a semi-circular locking means positioned at the front and the rear of the said base plate means and the said valve plate locking means adapted to lock the said plates in position, and gear controlling means connected to the said valve locking plate means and the said base plate means to control its position over the said base plate means, guiding it and locking it in place, substantially as described.

5. In valves of the character described comprising a pair of plates which are slidably positioned one over the other, a frame structure, a base plate connected and mounted upon said frame structure, a semi-circular rear locking section and a semi-circular front locking plate connected to said base plate, a pair of side guiding bars connected to said base plate, a closing plate positioned upon said base plate, comprising, a semi-circular front section adapted to engage said rear locking section of said base plate, a semi-circular rear section adapted to engage said front locking plate of said base plate and a pair of tapered guides adapted to engage the said side guiding bars of said base plate, and closing plate controlling means connected to said closing plate and said frame for controlling and holding in position said closing plate over said base plate, of said valve, substantially as described.

FRANK V. BARYCZ.